United States Patent
Kinoshita et al.

(10) Patent No.: US 10,022,876 B2
(45) Date of Patent: Jul. 17, 2018

(54) JOINT STRUCTURE FOR ROBOT

(71) Applicant: FANUC CORPORATION, Yamanashi (JP)

(72) Inventors: Satoshi Kinoshita, Yamanashi (JP); Yasuyoshi Tanaka, Yamanashi (JP); Satoshi Adachi, Yamanashi (JP); Hideyuki Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/477,530

(22) Filed: Apr. 3, 2017

(65) Prior Publication Data
US 2017/0312924 A1 Nov. 2, 2017

(30) Foreign Application Priority Data

Apr. 28, 2016 (JP) .................. 2016-091926

(51) Int. Cl.
*B25J 17/00* (2006.01)
*B25J 17/02* (2006.01)
(Continued)

(52) U.S. Cl.
CPC .......... *B25J 17/00* (2013.01); *B25J 15/0009* (2013.01); *B25J 15/08* (2013.01); *B25J 17/02* (2013.01);
(Continued)

(58) Field of Classification Search
CPC ........ B25J 17/00; B25J 15/0009; B25J 15/08; B25J 17/02; B25J 19/0079; B25J 19/0062; B25J 57/027; F16H 57/027
See application file for complete search history.

(56) References Cited

U.S. PATENT DOCUMENTS 3,314,306 A * 4/1967 Barclae ................. F16H 57/027
137/493.9
3,686,973 A * 8/1972 Davison, Jr. .......... F16H 57/027
74/606 R
(Continued)

FOREIGN PATENT DOCUMENTS

JP 775992 A 3/1995

OTHER PUBLICATIONS

English Abstract and Machine Translation for Japanese Publication No. 07-075992 A, published Mar. 20, 1995, 7 pgs.

*Primary Examiner* — Jake Cook
(74) *Attorney, Agent, or Firm* — Fredrikson & Byron, P.A.

(57) ABSTRACT

Provided is a joint structure for a robot which can prevent leakage of a lubricant which is charged to the interior of the joint structure while improving a drip-proof property. The joint structure for the robot includes: a first arm which is hollow; a second arm which is rotatably mounted to the first arm; a power transmission mechanism which is provided adjacent to the outside of the first arm, the power transmission mechanism including a gear and an inner space which houses the gear and is charged with a lubricant; a booster section which increases a pressure in an interior of the first arm to be higher than an outside pressure; and a one-way communication section which allows the interior of the first arm and the inner space to communicate with each other and a gas in the interior of the first arm to flow into the inner space, while preventing the lubricant in the inner space from flowing out to the interior of the first arm.

3 Claims, 5 Drawing Sheets

(51) Int. Cl.
  *B25J 18/00* (2006.01)
  *B25J 15/00* (2006.01)
  *B25J 15/08* (2006.01)
  *B25J 19/00* (2006.01)

(52) U.S. Cl.
  CPC ....... *B25J 19/0062* (2013.01); *B25J 19/0079* (2013.01)

(56) References Cited

U.S. PATENT DOCUMENTS

| | | | | |
|---|---|---|---|---|
| 5,318,331 | A * | 6/1994 | Tozuka | B25J 15/0206 294/106 |
| 6,015,444 | A * | 1/2000 | Craft | F16H 57/027 220/371 |
| 6,840,137 | B2 * | 1/2005 | Kaplan | F16H 57/027 74/606 R |
| 2005/0133305 | A1 * | 6/2005 | Okada | B25J 19/0062 184/65 |
| 2014/0034422 | A1 * | 2/2014 | Collmer | B25J 9/102 184/106 |

* cited by examiner

JOINT STRUCTURE FOR ROBOT

BACKGROUND OF THE INVENTION

1. Field of the Invention

The present invention relates to a joint structure for a robot.

2. Description of the Related Art

In a joint structure in which a robot arm and a wrist are connected to each other, techniques for increasing a pressure in the interior of the robot arm and the wrist to improve a drip-proof property have been known (e.g. Japanese Unexamined Patent Publication (Kokai) No. H7-75992).

In the joint structure as described above, a technique for preventing outflow of a lubricant which is charged to the interior of the joint structure while improving a drip-proof property has been demanded.

SUMMARY OF THE INVENTION

A joint structure of a robot comprises a hollow first arm, a second arm rotatably attached to the first arm, and a power transmission mechanism provided outside of the first arm so as to be adjacent to the first arm. The power transmission mechanism includes an inner space in which a lubricant is filled.

The joint structure of a robot comprises a booster section configured to increase a pressure in an interior of the first arm to be higher than an outside pressure, and a one-way communication section configured to fluidly connect the interior of the first arm to the inner space so as to be in fluid communication with each other, so that the one-way communication section allows a gas in the interior of the first arm to flow into the inner space, while the one-way communication section prevents the lubricant in the inner space from flowing out to the interior of the first arm.

The second arm may be hollow, and the inner space may be defined by the second arm. The one-way communication section may include a passage having a first opening which opens to the inner space and a second opening opposite the first opening, which opens to the interior of the first arm, and a one-way valve provided inside of the passage.

BRIEF DESCRIPTION OF THE DRAWINGS

The above-mentioned or other objects, features, and advantages of the invention will be clarified from the description of embodiments with reference to the accompanying drawings, in which.

DETAILED DESCRIPTION

Figure 1:
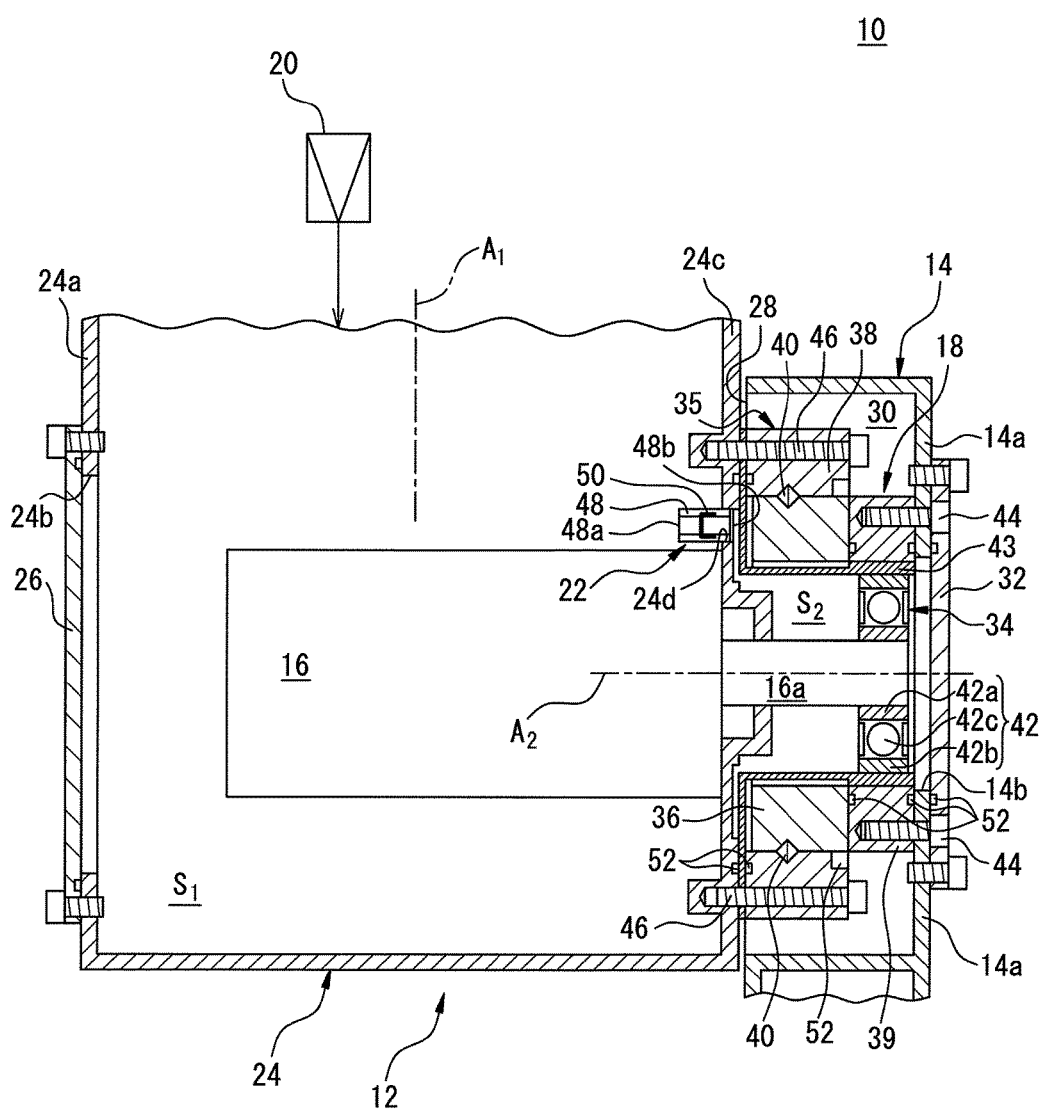
FIG. 1 is a cross-sectional view of a joint structure of a robot according to an embodiment of the invention.

Hereinafter, embodiments of the invention will be described in detail with reference to the drawings. First, referring to FIG. 1, a joint structure 10 of a robot according to an embodiment of the invention will be described. Note that, in the various embodiments described below, similar elements are assigned the same reference numerals, and overlapping description will be omitted. In addition, a rightward, leftward, upward, and downward directions in the following description respectively correspond to the rightward, leftward, upward, and downward directions in the drawings.

The joint structure 10 includes a first arm 12, a second arm 14, a servo motor 16, a power transmission mechanism 18, a booster section 20, and a one-way communication section 22.

The first arm 12 includes a body 24 and a cover 26. The body 24 is hollow, and extends along an axis $A_1$. An opening 24b is formed at a left wall 24a of the body 24.

The opening 24b is a hole which enables the operator to access to the inside of the body 24 during assembly of the joint structure 10 or the like. The cover 26 air-tightly covers the opening 24b. The body 24 and the cover 26 define an inner space $S_1$ which is air-tightly sealed from the outside.

The second arm 14 is attached to the first arm 12 so as to be rotatable about an axis $A_2$ orthogonal to the axis $A_1$. The second arm 14 is formed with a recess 30. The recess 30 is formed so as to be recessed rightward from a left end surface 28 of the second arm 14, which faces the first arm 12.

A right wall 14a of the second arm 14, which is located opposite the end surface 28, is formed with an opening 14b. The opening 14b is a hole which enables the operator to access to an inner space $S_2$ during assembly of the joint structure 10 or the like. The inner space $S_2$ will be described later. A cover 32 is attached to the wall 14a of the second arm 14 so as to air-tightly cover the opening 14b.

The servo motor 16 is fixed to an inner surface of a right wall 24c of the body 24. The servo motor 16 includes an output shaft 16a. The output shaft 16a extends along the axis $A_2$ so as to project out from the inner space $S_1$ of the first arm 12. The servo motor 16 functions as a drive section configured to generate rotational force for rotating the second arm 14 relative to the first arm 12 about the axis $A_2$.

The power transmission mechanism 18 is provided outside of the first arm 12 so as to be adjacent to the first arm 12, and housed in the recess 30 formed at the second arm 14. The power transmission mechanism 18 transmits the rotational force of the output shaft 16a rotated by the servo motor 16 to the second arm 14.

Specifically, the power transmission mechanism 18 includes a strain wave gearing device 34 and a cross roller ring 35. The strain wave gearing device 34 is a device referred to as harmonic drive (registered trademark), and includes a wave generator 42, a flex spline 43, and a circular spline 39.

The wave generator 42 includes an elliptical inner ring 42a fixed on the output shaft 16a, a flexible outer ring 42b, and a ball 42c arranged between the inner ring 42a and the outer ring 42b. The outer ring 42b is deformed by the ball 42c so as to conform to an elliptical outer shape of the inner ring 42a.

The flex spline 43 is made from an elastic material, and one end thereof is fixed to the wall 24c of the first arm 12 by bolts 46. An inner circumferential surface of the flex spline 43 is in contact with the outer ring 42b of the wave generator 42. Accordingly, the flex spline 43 is deformed so as to conform to an elliptical outer shape of the outer ring 42b. An outer circumferential surface of the flex spline 43 is formed with a gear.

The circular spline 39 has a ring shape, and is fixed to the wall 14a of the second arm 14 by bolts 44. An inner circumferential surface of the circular spline 39 is formed with a gear.

The gear formed on the outer circumferential surface of the flex spline 43 engages the gear formed on the inner circumferential surface of the circular spline 39 at a position corresponding to a major-axis portion of the inner ring 42a of the wave generator 42, while separating away from the gear formed on the inner circumferential surface of the circular spline 39 at a position corresponding to a minor-axis portion of the inner ring 42a.

As the output shaft 16a rotates, the engagement position between the gear formed on the outer circumferential surface of the flex spline 43 and the gear formed on the inner circumferential surface of the circular spline 39 rotates about the axis $A_2$. By such a rotational engagement, the circular spline 39 receives force from the flex spline 43 fixed to the first arm 12 so as to be rotated about the axis $A_2$.

The cross roller ring 35 includes an inner ring 36, an outer ring 38, and a roller 40 arranged between the inner ring 36 and the outer ring 38. The inner ring 36 has a ring shape, and a right end of the inner ring 36 is coupled with a left end of the circular spline 39, thereby the inner ring 36 rotates integrally with the circular spline 39.

The outer ring 38 has a ring shape, and is fixed to the wall 24c of the first arm 12 by the bolts 46. The inner ring 36 is rotatably supported by the roller 40 at radially inside of the outer ring 38.

The power transmission mechanism 18 has the inner space $S_2$. The inner space $S_2$ is defined by the wall 24c of the first arm 12, the cross roller ring 35, the circular spline 39, and the cover 32 which covers the opening 14b of the second arm 14.

The inner space $S_2$ is air-tightly sealed from the outside by oil seals and O-rings 52. The inner space $S_2$ is filled with a lubricant in order to lubricate the components of the power transmission mechanism 18 (i.e., the strain wave gearing device 34 and the cross roller ring 35).

The one-way communication section 22 fluidly connects the inner space $S_1$ of the first arm 12 to the inner space $S_2$ of the power transmission mechanism 18 so as to be in fluid communication with each other, so that the one-way communication section 22 allows a fluid to flow from the inner space $S_1$ to the inner space $S_2$, while preventing a fluid-flow from the inner space $S_2$ to the inner space $S_1$.

In this embodiment, the one-way communication section 22 includes a tubular member 48 and a one-way valve 50. The tubular member 48 has a first opening 48a and a second opening 48b opposite the first opening 48a, and is inserted into a through hole 24d formed at the wall 24c of the first arm 12.

The first opening 48a opens to the inner space $S_1$ of the first arm 12, while the second opening 48b opens to the inner space $S_2$ of the power transmission mechanism 18. The tubular member 48 defines a passage for a fluid, which extends between the first opening 48a and the second opening 48b, inside thereof.

The one-way valve 50 is arranged in the passage defined inside of the tubular member 48, and configured to allow a fluid to flow through the passage from the inner space $S_1$ to the inner space $S_2$, while it prevents a fluid from flowing from the inner space $S_2$ to the inner space $S_1$.

The booster section 20 includes an air pump or the like, and supplies a gas to the inner space $S_1$ of the first arm 12 so as to increase a pressure in the inner space $S_1$ to be higher than an outside pressure.

When the pressure in the inner space $S_1$ is increased by the booster section 20, a gas in the inner space $S_1$ flows through the one-way communication section 22 from the inner space $S_1$ toward the inner space $S_2$ to flow into the inner space $S_2$.

Thereby, a pressure in the inner space $S_2$ of the power transmission mechanism 18 also increases higher than the outside pressure. By increasing the pressures in the inner spaces $S_1$ and $S_2$ so as to be higher than the outside pressure in this way, it is possible to prevent a foreign material, such as cutting fluid, from entering the inner spaces $S_1$ and $S_2$, during operation of the joint structure 10.

On the other hand, since the one-way communication section 22 prevents a fluid-flow from the inner space $S_2$ to the inner space $S_1$, it is possible to prevent the lubricant filled in the inner space $S_2$ from flowing out to the inner space $S_1$ through the one-way communication section 22. Thus, according to this embodiment, both entrance of the foreign material and outflow of the lubricant can be prevented by a simple configuration.

Further, in this embodiment, the one-way communication section 22 can be easily mounted to the first arm 12 by merely inserting the tubular member 48, which houses the one-way valve 50 therein, into the through hole 24d. Therefore, a manufacturing process for the joint structure 10 can be simplified.

Next, referring to FIG. 2, a joint structure 60 of a robot according to another embodiment will be described. The joint structure 60 includes a first arm 62, a second arm 64, a drive section 66, a power transmission mechanism 68, the booster section 20, and a one-way communication section 70.

The first arm 62 is hollow, and extends along an axis $A_3$. The first arm 62 includes a body 72 and a cover 76. The body 72 includes a wall 72a which faces the second arm 64, a cylindrical boss 72b projecting leftward from the wall 72a, and a projection 72c arranged at a position separated downward from the boss 72b so as to project leftward from the wall 72a. The projection 72c is formed with a through hole 72d.

The cover 76 is fixed to the body 72 by bolts 78. The body 72 and the cover 76 define an inner space $S_3$ of the first arm 62.

The second arm 64 is attached to the first arm 62 via the power transmission mechanism 68 so as to be rotatable about an axis $A_4$.

The drive section 66 generates rotational force for rotating the second arm 64 relative to the first arm 62 about the axis $A_4$. Specifically, the drive section 66 includes a servo motor (not shown), a belt 80, and a pulley 82. The servo motor includes an output shaft and a pulley fixed to the output shaft (both not shown), and is fixed in the inner space $S_3$ of the first arm 62.

The pulley 82 includes a flange 82a and a shaft 82b projecting rightward from the flange 82a, and is rotatable about the axis $A_4$.

The belt 80 is a ring-shaped member, and is stretched at one side thereof on an outer circumference of the pulley fixed to the output shaft of the servo motor, while being stretched at the other side on an outer circumference of the flange 82a. The belt 80 rotates together with the output shaft of the servo motor, and in turn, rotates the pulley 82 about the axis $A_4$ along with its rotation. The rotation speed of the output shaft can be increased or reduces by changing an outer diameter of the pulley 82.

The power transmission mechanism 68 is provided outside of the first arm 62 and the second arm 64 so as to be adjacent to the first arm 62, and transmits the rotational force generated by the drive section 66 to the second arm 64.

Specifically, the power transmission mechanism 68 includes a strain wave gearing device 84 and a cross roller ring 85. Similarly to the above-mentioned strain wave gearing device 34, the strain wave gearing device 84 is a device referred to as harmonic drive (registered trademark), and includes a wave generator 92, a flex spline 86, and a circular spline 88.

The wave generator 92 includes an elliptical inner ring 92a fixed on the shaft 82b of the pulley 82, a flexible outer ring 92b, and a ball 92c arranged between the inner ring 92a and the outer ring 92b.

The flex spline 86 is made from an elastic material, and one end thereof is fixed to a wall 64a of the second arm 64 by bolts 100. An inner circumferential surface of the flex spline 86 is in contact with the outer ring 92b of the wave generator 92, while an outer circumferential surface of the flex spline 86 is formed with a gear.

The circular spline 88 has a ring shape, and is fixed to the wall 72a of the first arm 62 by bolts 96. An inner circumferential surface of the circular spline 88 is formed with a gear.

The gear formed on the outer circumferential surface of the flex spline 86 engages the gear formed on the inner circumferential surface of the circular spline 88 at a position corresponding to a major-axis portion of the inner ring 92a of the wave generator 92, while separating away from the gear formed on the inner circumferential surface of the circular spline 88 at a position corresponding to a minor-axis portion of the inner ring 92a.

As the pulley 82 rotates, the engagement position between the gear formed on the outer circumferential surface of the flex spline 86 and the gear formed on the inner circumferential surface of the circular spline 88 rotates about the axis $A_4$. By such a rotational engagement, the flex spline 86 receives force from the circular spline 88 fixed to the first arm 62 so as to be rotated about the axis $A_4$.

The cross roller ring 85 includes an outer ring 89 and a roller 90 arranged between the outer ring 89 and the circular spline 88. The outer ring 89 has a ring shape, and is fixed to the wall 64a of the second arm 64 by the bolts 100. The circular spline 88 is supported radially inside of the outer ring 89 by the roller 90 so as to be rotatable.

A bearing 94 is interposed between an inner circumferential surface of the boss 72b and the shaft 82b so as to rotatably support the shaft 82b. An oil seal 98 is arranged to be adjacent to the left side of the bearing 94. The oil seal 98 air-tightly seals a gap between the inner circumferential surface of the boss 72b and the shaft 82b.

The power transmission mechanism 68 has an inner space $S_4$ which is defined by the boss 72b of the first arm 62, the circular spline 88, the cross roller ring 85, the wall 64a of the second arm 64, and the oil seal 98.

The inner space $S_4$ is air-tightly sealed from the outside by the oil seal 98 and the O-ring 52. In order to lubricate the components of the power transmission mechanism 68 (i.e. the strain wave gearing device 84 and the cross roller ring 85), the inner space $S_4$ is filled with a lubricant.

The one-way communication section 70 includes a through hole 102, a first joint 108, a second joint 110, a pipe 112, and a one-way valve 106. The through hole 102 is formed in the boss 72b of the second arm 64 so that one end thereof opens to the inner space $S_4$ of the power transmission mechanism 68 and the other end thereof opens to the inner space $S_3$ of the first arm 62.

The first joint 108 is hollow and inserted into the through hole 102. The first joint 108 has a first opening 108a which opens in the through hole 102 and a second opening 108b opposite the first opening 108a.

The second joint 110 is hollow and inserted into the through hole 72d formed at the projection 72c. The second joint 110 has a first opening 110a and a second opening 110b opposite the first opening 110a. The second opening 110b opens to the inner space $S_3$.

The pipe 112 is an elongated pipe made from an elastic material, wherein one end thereof is connected to the second opening 108b of the first joint 108 and the other end thereof is connected to the first opening 110a of the second joint 110.

In this way, the through hole 102, the first joint 108, the second joint 110, and the pipe 112 define a passage for a fluid, one end of which opens to the inner space $S_4$ of the second arm 64 and the other end of which opens to the inner space $S_3$ of the first arm 62.

The one-way valve 106 is arranged inside of the second joint 110. The one-way valve 106 allows a fluid to flow through the passage, which is defined by the through hole 102, the first joint 108, the second joint 110 and the pipe 112, from the inner space $S_3$ to the inner space $S_4$, while preventing a fluid-flow from the inner space $S_4$ to the inner space $S_3$.

The booster section 20 supplies a gas to the inner space $S_3$ of the first arm 62 so as to increase a pressure in the inner space $S_3$ to be higher than an outside pressure. When the pressure in the inner space $S_3$ is increased by the booster section 20, the gas in the inner space $S_3$ flows into the second joint 110 via the second opening 110b, passes through the pipe 112, the first joint 108, and the through hole 102, and flows into the inner space $S_4$.

In this way, the one-way communication section 70 allows the gas to flow from the inner space $S_3$ to the inner space $S_4$. Due to this, a pressure in the inner space $S_4$ of the power transmission mechanism 68 also increases higher than the outside pressure. By increasing the pressures in the inner spaces $S_3$ and $S_4$ so as to be higher than the outside pressure in this way, it is possible to prevent a foreign material, such as cutting fluid, from entering the inner spaces $S_3$ and $S_4$, during operation of the joint structure 60.

On the other hand, since the one-way communication section 70 prevents a fluid-flow from the inner space $S_4$ to the inner space $S_3$ by the one-way valve 106, it is possible to prevent the lubricant filled in the inner space $S_4$ from flowing out to the inner space $S_3$ through the one-way communication section 70. Thus, according to this embodiment, both entrance of a foreign material and outflow of the lubricant can be prevented by a simple configuration.

Further, in this embodiment, the one-way valve 106 can be arranged at a position separated away from the through hole 102 formed in the wall 72a of the first arm 62 by the elongated pipe 112. According to this configuration, even when the one-way valve 106 cannot be directly mounted in the through hole 102 due to dimensional constraint of the inner space $S_3$ of the first arm 62, etc., it is possible to arrange the one-way valve 106 at a suitable position.

Next, referring to FIG. 3, a joint structure 120 of a robot according to still another embodiment will be described. The joint structure 120 includes an arm 122, an arm 124, an arm 126, the drive section 66, a drive section 128, the power transmission mechanism 68, a power transmission mechanism 130, a flange 156, the booster section 20, and a one-way communication section 133. The arm 122 (first arm) has a configuration similar to that of the above-mentioned first arm 62.

The arm 124 (first arm) extends along an axis $A_5$, and includes a body 132 and a cover 134. The body 132 includes a wall 132a which faces the arm 126 and a ring-shaped boss 132b which projects leftward from the wall 132a.

The cover 134 is fixed to the body 132 by bolts 136. The body 132, the cover 134, and oil seals 160 and 164 define an inner space $S_5$ of the arm 124.

Figure 2:
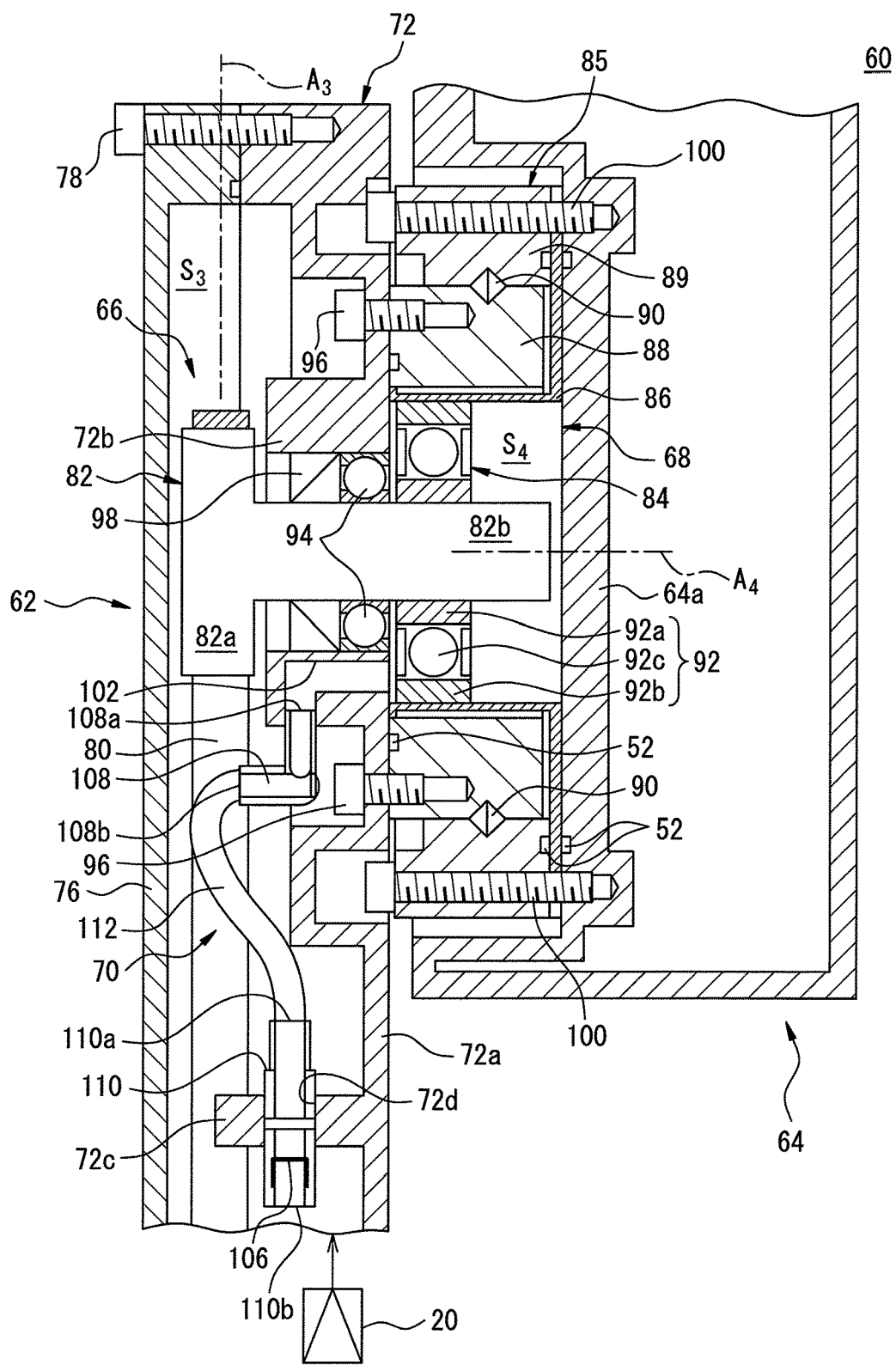
FIG. 2 is a cross-sectional view of a joint structure of a robot according to another embodiment of the invention.

Similarly to the embodiment shown in FIG. 2, the drive section 66 includes the servo motor (not shown), the belt 80, and the pulley 82, and generates rotational force for rotating the arm 126 relative to the arm 122 about the axis $A_4$.

The drive section 128 generates rotational force for rotating the flange 156. Specifically, the drive section 128 includes a servo motor (not shown), a belt 138, and a pulley 140. The servo motor includes an output shaft and a pulley fixed to the output shaft (both not shown), and is fixed in the inner space $S_5$ of the arm 124.

The pulley 140 includes a flange 140a and a shaft 140b projecting leftward from the flange 140a, and is rotatable about an axis $A_6$ orthogonal to the axis $A_5$.

The belt 138 has a ring shape, and is stretched at one side thereof on an outer circumference of the pulley fixed to the output shaft of the servo motor fixed in the inner space $S_5$, while being stretched at the other side on an outer circumference of the flange 140a. The belt 138 rotates together with the output shaft of the servo motor fixed in the inner space $S_5$, and in turn, rotates the pulley 140 about the axis $A_6$ along with its rotation. The rotation speed of the output shaft can be increased or reduced by adjusting outer diameters of the pulley 140 and the pulley fixed to the output shaft.

The arm 126 (second arm) is hollow, and attached to the arm 122 via the power transmission mechanism 68 so as to be rotatable about the axis $A_4$. Further, the arm 126 is supported by the arm 124 at a side opposite to the arm 122 so as to be rotatable about the axis $A_6$.

More specifically, the arm 126 includes walls 142, 144, 146, 148, 150, and 152. The wall 142 has a configuration similar to that of the above-mentioned wall 64a, and faces the arm 122. The wall 144 is arranged opposite to the wall 142, and faces the arm 124. The wall 146 extends between lower ends of the walls 142 and 144.

The wall 148 is a cylindrical wall arranged so as to surround the axis $A_6$, and extends leftward from the wall 144 so as to be parallel to the axis $A_6$. A bearing 158 and the oil seal 160 are interposed between the boss 132b of the arm 124 and the wall 148 of the arm 126.

The wall 150 is a ring-shaped wall extending from a left end of the wall 148 toward the axis $A_6$. The wall 152 is cylindrical, and projects rightward from an inner circumferential edge of the wall 150 so as to be parallel to the axis $A_6$.

The oil seal 164 and a bearing 162 arranged adjacent to a left side of the oil seal 164 are interposed between the shaft 140b of the pulley 140 and the wall 152 of the arm 126. The oil seal 164 air-tightly seals a gap between the shaft 140b and the wall 152. The pulley 140 is supported by the bearing 162 so as to be rotatable about the axis $A_6$.

Similarly to the embodiment shown in FIG. 2, the power transmission mechanism 68 includes the strain wave gearing device 84 and the cross roller ring 85, and transmits the rotational force generated by the drive section 66 to the arm 126. The power transmission mechanism 68 is provided outside of the arm 122 so as to be adjacent to the arm 122.

The power transmission mechanism 130 transmits rotational force generated by the drive section 128 to the flange 156. Specifically, the power transmission mechanism 130 includes a first bevel gear 168, a gear member 170, a strain wave gearing device 171, and a cross roller ring 173. The first bevel gear 168 is integrally fixed to a distal end of the shaft 140b of the pulley 140, and rotates integrally with the pulley 140 about the axis $A_6$.

The gear member 170 is supported by a bearing 174 so as to be rotatable about an axis $A_7$, and includes a second bevel gear 178 and a shaft 180. The second bevel gear 178 engages the first bevel gear 168 so as to be rotated about the axis $A_7$ along with the rotation of the first bevel gear 168. The shaft 180 is integrally fixed to the second bevel gear 178, and extends upward from the second bevel gear 178 along the axis $A_7$.

Similarly to the above-mentioned strain wave gearing devices 34 and 84, the strain wave gearing device 171 is a device referred to as harmonic drive (registered trademark), and includes a wave generator 172, a flex spline 175, and a circular spline 177.

The wave generator 172 includes an elliptical inner ring 172a fixed on the shaft 180 of the gear member 170, a flexible outer ring 172b, and a ball 172c arranged between the inner ring 172a and the outer ring 172b.

The flex spline 175 is made from an elastic material, and an upper end thereof is fixed to the flange 156. An inner circumferential surface of the flex spline 175 is in contact with the outer ring 172b of the wave generator 172, while an outer circumferential surface of the flex spline 175 is formed with a gear.

The circular spline 177 has a ring shape, and is fixed to the arm 126 by bolts 166. An inner circumferential surface of the circular spline 177 is formed with a gear.

The gear formed on the outer circumferential surface of the flex spline 175 engages the gear formed on the inner circumferential surface of the circular spline 177 at a position corresponding to a major-axis portion of the inner ring 172a of the wave generator 172, while separating away from the gear formed on the inner circumferential surface of the circular spline 177 at a position corresponding to a minor-axis portion of the inner ring 172a.

As the gear member 170 rotates, an engagement position between the gear formed on the outer circumferential surface of the flex spline 175 and the gear formed on the inner circumferential surface of the circular spline 177 rotates about the axis $A_7$. By such a rotational engagement, the flex spline 175 receives force from the circular spline 177 fixed to the arm 126 so as to be rotated about the axis $A_7$.

The cross roller ring 173 includes an inner ring 186, an outer ring 188 and a roller 184 arranged between the inner ring 186 and the outer ring 188. The inner ring 186 has a ring shape, and is fixed to the flange 156 at an upper end thereof.

The outer ring 188 has a ring shape, and is fixed to the arm 126 by the bolts 166. The inner ring 186 is supported by the roller 184 at radially inside of the outer ring 188 so as to be rotatable.

The power transmission mechanism 130 has an inner space $S_7$ which is defined by the hollow arm 126. Further specifically, the inner space $S_7$ is defined by the walls 142, 144, 146, 148, 150 and 152 of the arm 126, the oil seal 164, the circular spline 177, the cross roller ring 173, and the flange 156.

The inner space $S_7$ is air-tightly sealed from the outside by the oil seal 164 and an O-ring 182. In order to lubricate the components of the power transmission mechanism 130 (i.e. the first bevel gear 168, the gear member 170, the strain wave gearing device 171, and the cross roller ring 173), the inner space $S_7$ is filled with a lubricant.

The flange 156 is supported so as to be rotatable about the axis $A_7$, and is rotated integrally with the flex spline 175 of the strain wave gearing device 171. An end effector, such as a robot hand or a welding gun, a tool, or the like is connected to the flange 156.

The one-way communication section 133 fluidly connects the inner space $S_5$ of the arm 124 to the inner space $S_7$ of the power transmission mechanism 130 so as to be in fluid communication with each other, so that the one-way communication section 133 allows a fluid to flow from the inner space $S_5$ to the inner space $S_7$, while preventing a fluid-flow from the inner space $S_7$ to the inner space $S_5$.

The one-way communication section 133 includes a tubular member 190 and a one-way valve 192. The tubular member 190 has a first opening 190a and a second opening 190b opposite the first opening 190a, and is inserted into a through hole 150a formed at the wall 150 of the arm 126.

The first opening 190a opens to the inner space $S_7$ of the power transmission mechanism 130, while the second opening 190b opens to the inner space $S_5$. The tubular member 190 defines a passage for a fluid, which extends between the first opening 190a and the second opening 190b, inside thereof.

The one-way valve 192 is arranged in the passage defined inside of the tubular member 190, and allows a fluid to flow through the passage from the inner space $S_5$ to the inner space $S_7$, while preventing a fluid-flow through the passage from the inner space $S_7$ to the inner space $S_5$.

The booster section 20 supplies a gas to the inner space $S_5$ of the arm 124 so as to increase a pressure in the inner space $S_5$ to be higher than an outside pressure. When the pressure in the inner space $S_5$ is increased by the booster section 20, a gas in the inner space $S_5$ flows into the tubular member 190, passes through the one-way valve 192, and flows into the inner space $S_7$.

Due to this, a pressure in the inner space $S_7$ of the arm 126 also increases higher than the outside pressure. By increasing the pressures in the inner spaces $S_5$ and $S_7$ to be higher than the outside pressure in this way, it is possible to prevent a foreign material, such as cutting fluid, from entering the inner spaces $S_5$ and $S_7$ during operation of the joint structure 120.

On the other hand, since the one-way communication section 133 prevents the fluid-flow from the inner space $S_7$ to the inner space $S_5$ by the one-way valve 192, it is possible to prevent the lubricant filled in the inner space $S_7$ from flowing out to the inner space $S_5$ through the one-way communication section 133. Thus, according to this embodiment, both entrance of a foreign material and outflow of a lubricant can be prevented by a simple configuration.

Next, referring to FIG. 4, a joint structure 200 of a robot according to still another embodiment will be described. The joint structure 200 differs from the joint structure 120 shown in FIG. 3 in the following configuration, wherein the joint structure 200 further includes a one-way communication section 202.

The one-way communication section 202 fluidly connects the inner space $S_4$ of the power transmission mechanism 68 to the inner space $S_7$ of the power transmission mechanism 130 so as to be in fluid communication with each other, so that the one-way communication section 202 allows a fluid to flow from the inner space $S_7$ to the inner space $S_4$, while preventing a fluid-flow from the inner space $S_4$ to the inner space $S_7$.

The one-way communication section 202 includes a tubular member 204 and a one-way valve 206. The tubular member 204 has a first opening 204a and a second opening 204b opposite the first opening 204a, and is inserted into a through hole 142a formed at the wall 142 of the arm 126.

The first opening 204a opens to the inner space $S_4$ of the power transmission mechanism 68, while the second opening 204b opens to the inner space $S_7$ of the power transmission mechanism 130. The tubular member 204 defines a passage for a fluid, which extends between the first opening 204a and the second opening 204b, inside thereof.

The one-way valve 206 is arranged in the passage defined inside of the tubular member 204, and allows a fluid to flow through the passage from the inner space $S_7$ to the inner space $S_4$, while preventing a fluid-flow through the passage from the inner space $S_4$ to the inner space $S_7$.

When the pressures in the inner space $S_5$ of the arm 124 and the inner space $S_7$ of the arm 126 are increased by the booster section 20, a gas in the inner space $S_7$ passes through the one-way communication section 202 and flows into the inner space $S_4$. Thereby, a pressure in the inner space $S_4$ of the power transmission mechanism 68 also increases higher than an outside pressure.

By increasing the pressures in the inner spaces $S_4$, $S_5$ and $S_7$ to be higher than the outside pressure in this way, it is possible to prevent a foreign material, such as cutting fluid, from entering the inner spaces $S_4$, $S_5$ and $S_7$ during operation of the joint structure 200.

On the other hand, since the one-way communication section 202 prevents a fluid-flow from the inner space $S_4$ to the inner space $S_7$ by the one-way valve 206, it is possible to prevent the lubricant filled in the inner space $S_4$ from flowing out to the inner space $S_7$ through the one-way communication section 202.

Figure 5:
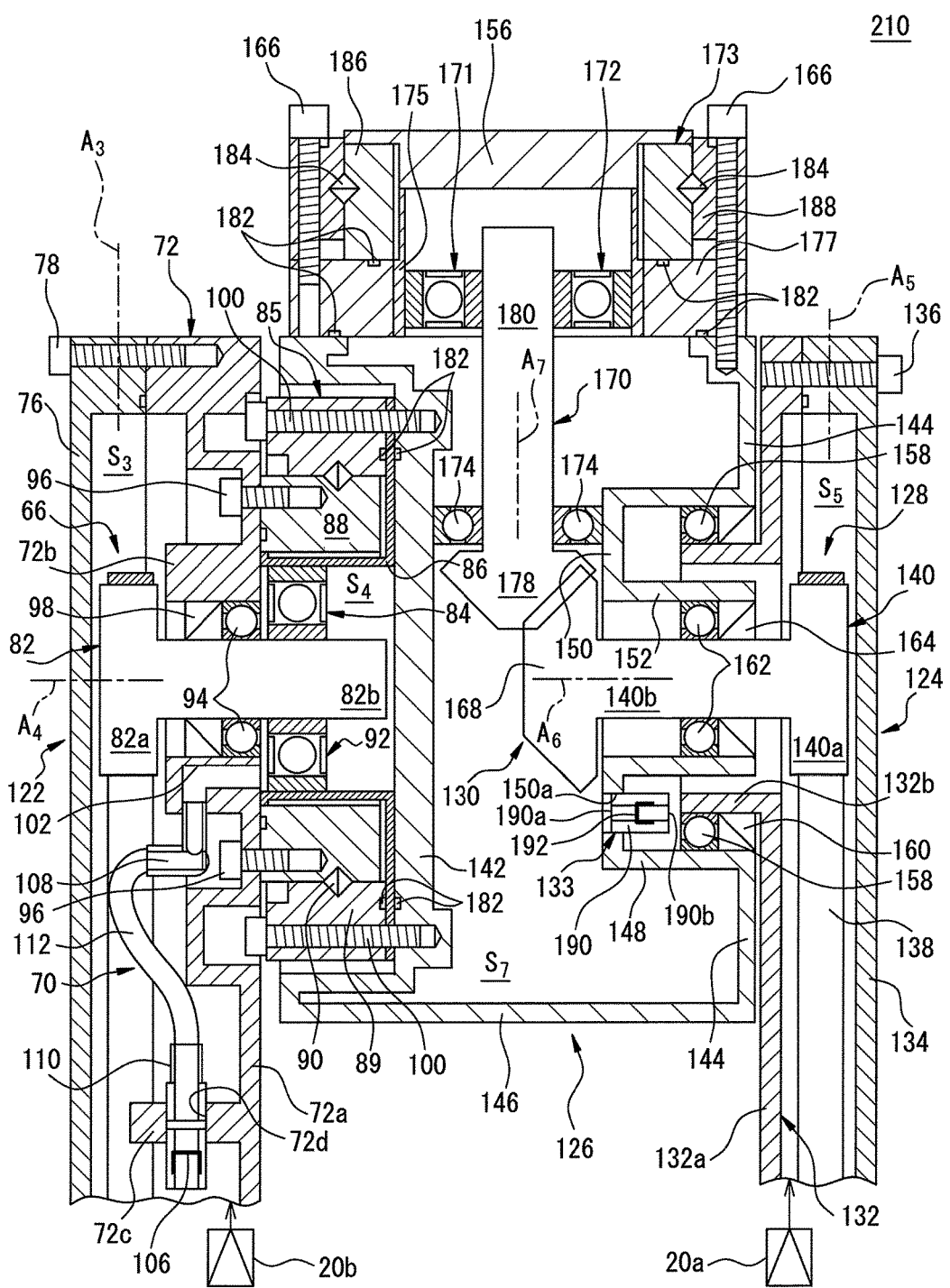
FIG. 5 is a cross-sectional view of a joint structure of a robot according to still another embodiment of the invention.

Next, referring to FIG. 5, a joint structure 210 of a robot according to still another embodiment will be described. The joint structure 210 differs from the joint structure 120 shown in FIG. 3 in the following configuration, wherein the joint structure 210 further includes the one-way communication section 70, a first booster section 20a, and a second booster section 20b.

Similarly to the embodiment shown in FIG. 2, the one-way communication section 70 includes the through hole 102, the first joint 108, the second joint 110, the pipe 112, and the one-way valve 106.

Figure 3:
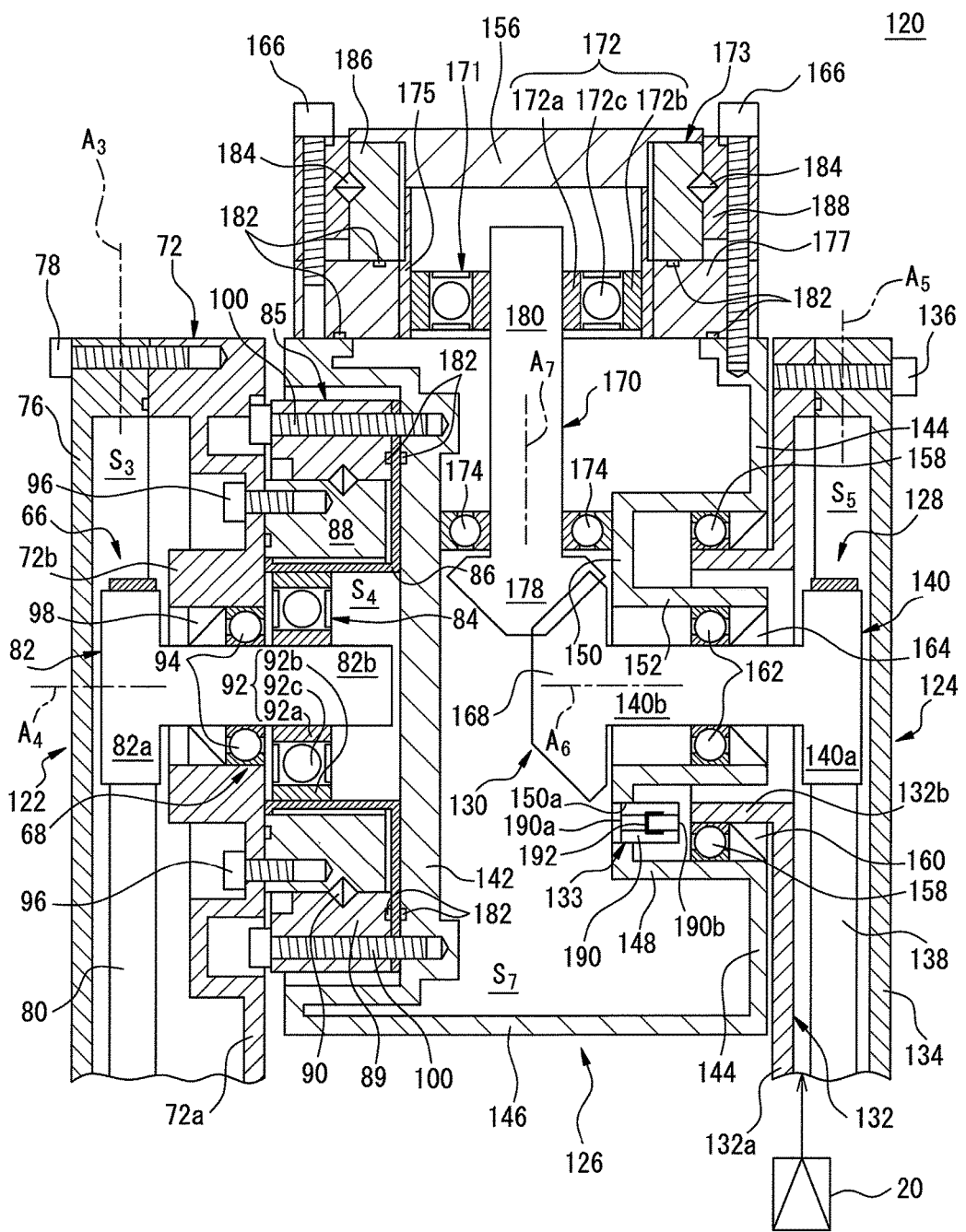
FIG. 3 is a cross-sectional view of a joint structure of a robot according to still another embodiment of the invention.
Figure 4:
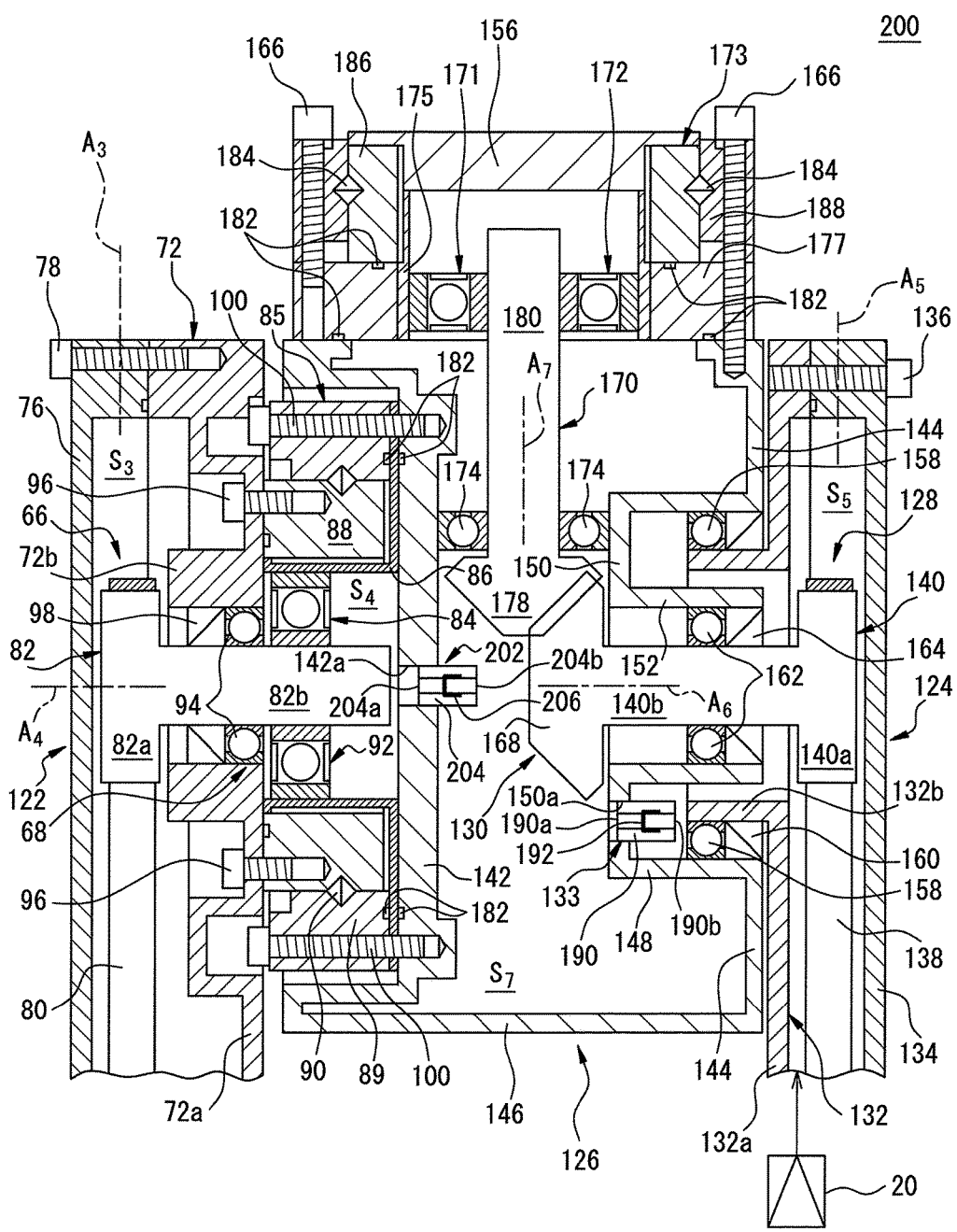
FIG. 4 is a cross-sectional view of a joint structure of a robot according to still another embodiment of the invention.

Similarly to the booster section 20 shown in FIG. 3, the first booster section 20a supplies a gas to the inner space $S_5$ of the arm 124 so as to increase the pressure in the inner space $S_5$ to be higher than an outside pressure. Further, similarly to the booster section 20 shown in FIG. 2, the second booster section 20b supplies a gas to the inner space $S_3$ of the arm 122 so as to increase the pressure in the inner space $S_3$ to be higher than the outside pressure.

According to this embodiment, the pressures in the inner spaces $S_5$, $S_7$, $S_3$ and $S_4$ are increased by the first booster section 20a and the second booster section 20b, thereby it is possible to prevent a foreign material, such as cutting fluid, from entering the inner spaces $S_5$, $S_7$, $S_3$ and $S_4$ during operation of the joint structure 210.

On the other hand, since the one-way communication sections 133 and 70 respectively prevent the fluid-flows from the inner space $S_7$ to the inner space $S_5$ and from the inner space $S_4$ to the inner space $S_3$, it is possible to prevent the outflows of the lubricants filled in the inner spaces $S_7$ and $S_4$.

Note that, in the above-mentioned embodiments, the power transmission mechanisms 18, 68 and 130 include the strain wave gearing devices 34, 84 and 171, respectively. However, the power transmission mechanism may include any type of reducer, such as a differential gear reducer, a spur gear reducer, a planetary gear reducer, a cycloid reducer or the like. Alternatively, the power transmission mechanism may be one configured to transmit force by means of a chain or a belt, without a gear.

While the invention has been described in terms of embodiments of the invention, the embodiments as described above do not limit the invention as recited in the claims. In addition, although a mode in which the features described in the embodiments of the invention are combined can be also included in the technical scope of the invention, all the combinations of these features are not always essential for solution means of the invention. Further, it is also apparent for those skilled in the art that various modifications or improvements can be added to the above embodiments.

It should be noted that with regard to an execution order of each processing such as an operation, a procedure, a step, a process, a stage, and the like in the device, the system, the program, and the method as recited in the claims, the specification, and the drawings, each processing can be realized in an optional order unless explicit description is made in particular such as "before" and "prior to" and an output of prior processing is used in subsequent processing. With regard to an operation flow in the claims, the specification, and the drawings, even when description has been made using "first", "next", "then", "subsequent" and the like for convenience sake, it is not meant that execution in this order is essential.

The invention claimed is:

1. A joint structure of a robot, comprising:
    a hollow first arm;
    a second arm rotatably attached to the first arm;
    a power transmission mechanism provided outside of the first arm so as to be adjacent to the first arm, the power transmission mechanism including an inner space in which a lubricant is filled;
    a booster section configured to increase a pressure in an interior of the first arm to be higher than an outside pressure; and
    a one-way communication section configured to fluidly connect the interior of the first arm to the inner space so as to be in fluid communication with each other,
    the one-way communication section having a one-way communication valve that allows a gas in the interior of the first arm to flow into the inner space, while the one-way communication section prevents the lubricant in the inner space from flowing out to the interior of the first arm.

2. The joint structure according to claim 1, wherein the second arm is hollow, and the inner space is defined by the second arm.

3. The joint structure according to claim 1, wherein the one-way communication section includes:
    a passage having a first opening which opens to the inner space and a second opening opposite the first opening, which opens to the interior of the first arm; and
    the one-way communication valve being provided inside of the passage.

* * * * *